(12) United States Patent
Smith et al.

(10) Patent No.: US 6,835,259 B1
(45) Date of Patent: Dec. 28, 2004

(54) ULTRASONIC SPLICING OF PHOTOGRAPHIC FILM STRIPS

(75) Inventors: Thomas M. Smith, Spencerport, NY (US); Frederick J. Oleson, Brockport, NY (US); Robert W. Easterly, Churchville, NY (US); Jan A. Chrisler, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/716,156

(22) Filed: Nov. 18, 2003

(51) Int. Cl.[7] ............................................. B32B 31/16
(52) U.S. Cl. ...................... 156/73.4; 156/73.1; 156/157
(58) Field of Search ............................... 156/73.1, 73.4, 156/157, 304.1, 304.6, 308.2, 502, 580.1, 580.2

(56) References Cited

U.S. PATENT DOCUMENTS

| | | | |
|---|---|---|---|
| 2,577,570 A | | 12/1951 | Eisenberg |
| 3,574,037 A | | 4/1971 | Deans et al. |
| 3,661,667 A | * | 5/1972 | Gardner et al. ............ 156/73.4 |
| 3,687,786 A | | 8/1972 | Williams et al. |
| 3,700,532 A | | 10/1972 | Pierson |
| 3,728,183 A | | 4/1973 | Wasco et al. |
| 3,867,232 A | | 2/1975 | Thompson et al. |
| 3,904,474 A | | 9/1975 | Wasco et al. |
| 3,962,008 A | * | 6/1976 | Scardilli et al. ............ 156/73.4 |
| 4,029,538 A | | 6/1977 | Vance, Jr. |
| 4,490,199 A | | 12/1984 | Dunning |
| 5,320,694 A | * | 6/1994 | Dietzsch .................... 156/73.4 |
| 5,356,682 A | | 10/1994 | Stewart et al. |
| 5,447,588 A | | 9/1995 | Merz et al. |
| 5,632,831 A | | 5/1997 | Stull |
| 5,679,207 A | | 10/1997 | Palone et al. |
| 5,961,025 A | | 10/1999 | Fukumoto et al. |

FOREIGN PATENT DOCUMENTS

EP    0 497 393    8/1992

* cited by examiner

*Primary Examiner*—James Sells
(74) *Attorney, Agent, or Firm*—Andrew J. Anderson

(57) ABSTRACT

In accordance with one embodiment of the invention, a method is described for ultrasonically splicing together overlapping ends of first and second lengths of photographic film strips of common film strip width with a film splicer employing a stationary elongated ultrasonic horn positioned on one side of the overlapping film strip ends in the width direction and a relatively movable anvil positioned on the opposite side of the overlapping film strip ends which traverses across the overlapping film ends by sliding or rolling in the length direction of the horn while the horn is ultrasonically vibrated and which provides pressure to the overlapping film ends while traversing across the overlapping film ends such that ultrasonic energy from the horn is transferred to the overlapping film ends effecting an ultrasonic weld between such film ends, wherein one of the first and second lengths of photographic film strips comprises an acetate based film strip and the other of the first and second lengths of photographic film strips comprises an acetate based film strip or a polyester based film strip, and wherein the product of the anvil pressure and anvil traverse rate is less than 6.0 kg,mm/sec when the anvil is slid across the overlapping film ends and less than 3.5 kg.mm/sec when the anvil is rolled across the overlapping film ends. The method enables the use of existing commercially available ultrasonic splicers to splice either polyester-based films to acetate-based films or acetate-based films to themselves and provide an adequate level of splice strength and smoothness.

12 Claims, No Drawings

ULTRASONIC SPLICING OF PHOTOGRAPHIC FILM STRIPS

FIELD OF THE INVENTION

This invention relates to a method of utilizing ultrasonic welding technology to splice together photographic film strips, and especially motion picture films having dissimilar polymeric supports. In particular, the invention relates to process conditions that can be employed with currently available commercial ultrasonic splicing devices designed for splicing polyester based films that will allow successful splicing of acetate support (e.g., cellulose triacetate (CTA)) based films to themselves and especially splicing of acetate based films to polyester support (e.g., polyethylene terephthalate (PET)) based films.

BACKGROUND OF THE INVENTION

Motion picture photographic films used in producing a release print (the film projected in movie theaters) include camera origination film, intermediate film, and the release print film. Current practice for most motion picture film production involves the use of at least four photographic steps. The first step is the recording of the scene onto a camera negative photographic film. While the original negative (typically after editing) may be printed directly onto a negative working print film in a second step to produce a direct release print, most motion picture productions use an additional two intermediate steps. Typically, the original camera negative film is printed onto a negative working intermediate film, such as Eastman Color Intermediate Film, yielding a master positive. The master positive is subsequently printed again onto an intermediate film providing a duplicate negative. Finally, the duplicate negative is printed onto a print film forming the release print. In practice, several duplicate negative copies are produced from the master positive, and each of the duplicate negatives may then be used to make hundreds of print film copies. This multistep process helps save the integrity of the valuable original camera negative film in preparing multiple release prints. In certain situations, usually involving special effects, intermediate film may be used an additional two or more times in preparing the final duplicate negatives to be used in printing the release prints. In this case, the first duplicate negative is used to print onto intermediate film to produce a second master positive, which is in turn used to produce a second duplicate negative. The second duplicate negative may be then used for printing the release prints.

The wide variety of potential film products available for the above mentioned processes can be produced on either of two commonly employed polymeric supports: cellulose triacetate (CTA) and polyethylene terephthalate (PET). It is becoming more common for specific film codes to be available on only one of these supports as opposed to either. Historically, acetate-based films, and the older, less common cellulose nitrate-based films, were spliced to themselves using film cement comprising organic solvents designed to partially solubilize the cellulose-based film supports. Satisfactory cement splicing requires careful scraping away of the emulsion layers of the lower film component prior to application of the film cement in order to allow intimate support contact. It is also important to allow sufficient clamping time in the splicer. Current recommendations are fifteen to thirty seconds under modest heat and pressure prior to handling of the splice. Because a cement splice does not attain full strength for several hours, care is required when handling the film if immediate use is contemplated. Not only is this splicing technique cumbersome, time consuming, and a source of debris, but there are also health, safety and environmental concerns surrounding the components of the currently employed film cements.

With the advent of PET-based film products, a new splicing technique was required since this film support does not readily lend itself to cement splicing. The polymer used as the support base is not soluble in the solvents used in film cement and even more toxic solvents would be required to produce the same type of bonding with PET-based films. The most common method of splicing PET-based film, when it was originally introduced, was the use of pressure sensitive tapes. These tapes are costly, cumbersome, and require application to imaged frames adjacent to the splice itself.

A more convenient method of splicing PET-based films has been with the use of ultrasonic energy to essentially "weld" the two film members together. This splicing technique is typically accomplished in an overlap configuration, and within an area that will exclude perforations and/or an imaged frame. U.S. Pat. Nos. 3,574,037 and 4,029,538, and EP 0497 393, e.g., describe systems and apparatus employing the use of ultrasonic sealing devices that can be used to splice films, specifically motion picture films. These patents, however, refer only to the splicing or welding of polyester-based film products. In addition, U.S. Pat. Nos. 5,356,682 A1 and 5,447,588 A1 teach the use of ultrasonic splicing of polyester (PET) webs used in the manufacture of photographic film support. Other patents, most notably U.S. Pat. Nos. 5,679,207 A1 and 5,961,025 A1, teach the use of ultrasonic energy and the developed apparatus that can be used to prepare lap splices on unspecified polymeric supports that could be used in the manufacture of photographic film base.

While the use of ultrasonic welding techniques have been suggested for splicing of acetate based film strips, attempts to do so have generally not been successful. Motion picture film splicers that have been developed which utilize ultrasonic energy to splice PET-based films together, e.g., when used to splice CTA-based films, cause brittleness and diminished strength typically resulting in splices which are far too weak and/or rough for practical application. Such splices also may exhibit levels of roughness that are likely to damage adjacent areas of film when wound in roll form. Additionally, the increased thickness produced by the molten acetate material may prevent splices from smooth conveyance through the tight tolerances encountered in film printing gates. Similarly, using existing ultrasonic splicing devices to join CTA and PET film stocks produces the same rough, distorted surface of the acetate film member. U.S. Pat. No. 3,700,532, e.g., notes some typical problems associated with attempts to ultrasonically splice acetate based film strips together.

There are numerous other patents that utilize similar ultrasonic technology and sealing equipment but are not related to the splicing of motion picture film or other photographic applications. One such example is U.S. Pat. No. 4,490,199 A1, which relates to a method and apparatus for splicing polymeric webs using a "spot welding" technique that employs ultrasonic energy as a means creating the splice. The polymeric webs cited in the example consist of a filled polycaprolactam composite. U.S. Pat. Nos. 3,728,183 A1 and 3,904,474 A1 also deal with the use of ultrasonic splicing thermoplastic sheets in non-photographic applications.

Another example is U.S. Pat. No. 5,632,831 A1, which relates to the use of an ultrasonic sealing device that can be used to splice together (unspecified) polymeric webs. More specifically this patent pertains to the removal of defective areas and re-joining the web in a seamless manner as a quality control improvement in the manufacture of consumer product packaging materials.

Current commercially available ultrasonic splicers for photographic film strips, and in particular motion picture film strips, include those manufactured by the Hollywood Film Company and the Metric Splicer and Film Company, Inc. Both manufacturers produce splicing units that will adequately fuse polyester film to itself (either raw or processed) without the need for tape, solvent cement, or emulsion scraping. Each manufacturer provides splicing units which utilize an elongated ultrasonic horn that is approx. 2 mm in width and 38 mm in length, mounted in the base of the units. The film members intended to be spliced together are mounted such that overlapped ends of each film member positioned are above this horn, with the length of the horn extending across the width of the film strips. During use, the horn is energized, and intimate contact is then made between the horn and the film strips as an anvil positioned on the opposite side of the film strips (relative to the horn) traverses over the film members in the length direction of the horn such that ultrasonic energy from the horn is transferred to the overlapping film ends effecting an ultrasonic weld between such film ends.

One notable difference between different commercial units is the design and geometry of the anvil. The Hollywood Film Company HFC 2K model utilizes a radiused, polished steel sled-type anvil having a width of 4 mm and a length of 10 mm. This sled is pulled across the film members using a cable and pulley system. As supplied by the manufacturer, the model HFC 2K splicer is provided with an anvil pressure of approximately 1.8 kg and an anvil traverse time of eight seconds across a 35 mm film strip (traverse rate of approx. 4.4 mm/sec).

The Hollywood Film Company HFC 24700 model and the Metric Splicer and Film Company, Inc. Model 3001 ultrasonic film splicers both utilize a polished steel roller having a width of 6 mm and a diameter of 20 mm, which is rolled across the overlapped film members. The HFC 24700 model unit uses a cable and pulley drive whereas the Metric Model 3001 unit uses a rack and pinion drive mechanism. As supplied by the manufacturer, Hollywood Film Company's model 24700 splicer has an anvil pressure of approximately 0.9 kg and an anvil traverse time of eight seconds across a 35 mm film strip (traverse rate of approx. 4.4 mm/sec). As supplied by the manufacturer, The Metric Model 3001 splicer has an anvil pressure of approximately 1.0 kg and an anvil traverse time of 7.5 seconds across a 35 mm film strip (traverse rate of approx. 4.7 mm/sec).

While the above described commercially available ultrasonic film splicers are effective for splicing polyester based film strips to each other, to date no one has provided a method for successfully splicing together motion picture film strips composed of dissimilar polymeric supports (and in particular, the splicing of acetate based films to polyester based films) that does not rely on the use of pressure-sensitive tape. The prior art has also failed to provide a method of splicing cellulosic-based motion picture film without the need for removal of the emulsion layer and application of a flammable and toxic solvent mixture. It would be particularly advantageous to provide a method for using the commercially available types of ultrasonic splicers employing sliding or rolling anvils for splicing acetate based film strips to each other, and especially for splicing acetate based film strips to polyester based film strips.

SUMMARY OF THE INVENTION

In accordance with one embodiment of the invention, a method is described for ultrasonically splicing together overlapping ends of first and second lengths of photographic film strips of common film strip width with a film splicer employing a stationary elongated ultrasonic horn positioned on one side of the overlapping film strip ends in the width direction and a relatively movable anvil positioned on the opposite side of the overlapping film strip ends which traverses across the overlapping film ends by sliding or rolling in the length direction of the horn while the horn is ultrasonically vibrated and which provides pressure to the overlapping film ends while traversing across the overlapping film ends such that ultrasonic energy from the horn is transferred to the overlapping film ends effecting an ultrasonic weld between such film ends, wherein one of the first and second lengths of photographic film strips comprises an acetate based film strip and the other of the first and second lengths of photographic film strips comprises an acetate based film strip or a polyester based film strip, and wherein the product of the anvil pressure and anvil traverse rate is less than 6.0 kg.mm/sec when the anvil is slid across the overlapping film ends and less than 3.5 kg.mm/sec when the anvil is rolled across the overlapping film ends.

The method of the invention enables the use of existing commercially available ultrasonic splicers to splice either polyester-based films to acetate-based films or acetate-based films to themselves and provide an adequate level of splice strength and smoothness. The invention enables formation of composite rolls of motion picture film containing different film bases as well as eliminating the need for emulsion skiving, and the use of toxic, flammable film cements when splicing CTA films.

In a preferred embodiment, anvil pressure and anvil traverse rates are specified that will allow successful splicing of acetate-based film to itself or to PET-based films using an ultrasonic splicer employing a sliding anvil such as Model HFC 2K ultrasonic film splicer from Hollywood Film Company.

In another embodiment, anvil pressure and traverse rates are specified that will allow successful splicing of acetate-based film to itself or to PET-based films using an ultrasonic splicer employing a rolling anvil such as a Model 24700 ultrasonic film splicer from Hollywood Film Company or a Model 3001 ultrasonic film splicer from Metric Splicer & Film Company, Inc.

DETAILED DESCRIPTION OF THE INVENTION

In accordance with a first embodiment of the invention, overlapping ends of first and second lengths of photographic film strips of common film strip width are ultrasonically spliced together with a film splicer employing a stationary elongated ultrasonic horn positioned on one side of the overlapping film strip ends in the width direction and a relatively movable anvil positioned on the opposite side of the overlapping film strip ends which traverses across the overlapping film ends by sliding in the length direction of the horn while the horn is ultrasonically vibrated and which provides pressure to the overlapping film ends while traversing across the overlapping film ends such that ultrasonic energy from the horn is transferred to the overlapping film ends effecting an ultrasonic weld between such film ends, wherein one of the first and second lengths of photographic film strips comprises an acetate based film strip and the other of the first and second lengths of photographic film strips comprises an acetate based film strip or a polyester based film strip, and wherein the product of the anvil pressure and anvil traverse rate is less than 6.0 kg.mm/sec, more preferably less than 5.0 kg.mm/sec. The anvil pressure in accordance with such embodiment is preferably less than 1.8 kg, more preferably about 1.1 kg, and the anvil traverse rate is preferably less than or equal to 4.4 mm/sec.

In accordance with a second embodiment of the invention, overlapping ends of first and second lengths of photographic film strips of common film strip width are ultrasonically spliced together with a film splicer employing a stationary elongated ultrasonic horn positioned on one side of the overlapping film strip ends in the width direction and a relatively movable anvil positioned on the opposite side of the overlapping film strip ends which traverses across the overlapping film ends by rolling in the length direction of the horn while the horn is ultrasonically vibrated and which provides pressure to the overlapping film ends while traversing across the overlapping film ends such that ultrasonic energy from the horn is transferred to the overlapping film ends effecting an ultrasonic weld between such film ends, wherein one of the first and second lengths of photographic film strips comprises an acetate based film strip and the other of the first and second lengths of photographic film strips comprises an acetate based film strip or a polyester based film strip, and wherein the product of the anvil pressure and anvil traverse rate is less than 3.5 kg.mm/sec, more preferably less than 3.0 kg.mm/sec. The anvil pressure in accordance with such embodiment is preferably less than 0.9 kg, more preferably less than or equal to about 0.7 kg, and the anvil traverse rate is preferably less than or equal to 4.4 mm/sec, more preferably less than or equal to 3.5 mm/sec. In particular, the anvil pressure is preferably within the range of 0.6 to 0.8 kg and the anvil traverse rate is preferably within the range of from about 2.5 to 4.4 mm/sec, more preferably from about 2.5 to 3.5 mm/sec, when employing a rolling anvil.

The ability to splice acetate-based film using ultrasonic energy with particularly specified sliding and rolling anvil pressure and traverse rates in accordance with the invention eliminates the need for emulsion layer skiving as well as the use of flammable and toxic solvent cements. In addition, it provides the capability for joining together dissimilar film products. This invention allows for the use of ultrasonic energy to be used for splicing together acetate-based film products with resultant strong and smooth splices. It also allows for acetate-based film to be adequately spliced to polyester-based film products, which until now has been impossible without the use of pressure sensitive tape.

EXAMPLES

The following examples are intended to illustrate the present invention more practically but not to limit it in scope in any way.

Film materials used to evaluate the effectiveness of ultrasonic splicing represent a cross-section of Eastman Kodak motion picture film products on both acetate and polyester base. All films tested were unexposed, processed, 35 mm products that are currently in production. The specific (EK) film codes and brief description are listed below:

2238—a polyester-based panchromatic separation film intended for making archival black-and-white separation positives from color negative originals.

2234—a polyester-based panchromatic negative film intended for making duplicate negatives from master positives, or internegatives from reversal originals.

5234—an acetate-based version of 2234.

2383—a polyester-based color print film.

5279—an acetate-based color negative film.

Six-inch lengths of film were spliced together in various combinations and tested for tensile strength, peel strength, and surface roughness on the spliced area. Models HFC 2K (sliding anvil) and 24700 (rolling anvil) ultrasonic film splicers from Hollywood Film Company and a Model 3001 (rolling anvil) ultrasonic film splicer from Metric Splicer & Film Company, Inc. were used in the preparation of all ultrasonic splice (invention and comparison) samples. In all cases, the film sections were oriented according to the splicer manufacturer's directions. In the case of Hollywood Film Company splices, the emulsion side of the film was in contact with the ultrasonic horn during splicing. In the case of Metric splices, the emulsion side of the film was in contact with the anvil during splicing. For both units, the polyester-based component was in contact with the ultrasonic horn when hybrid splices were prepared. There was no scraping or removal of emulsion or backing layers prior to ultrasonic splicing.

Cement splices were prepared on acetate films to serve as a comparison for ultrasonic splices. All film cement splicing was done on a Maier-Hancock, model 1635, splicer. The emulsion layer was scraped away for the preparation of all splices and they were made with Kodak Film Cement. All film cement splices were clamped for thirty seconds with a splicing block temperature of approximately 43° C.

Tensile strength was measured by separation of the splice sample on an Instron Tensile Tester (model 4301) at a separation rate of 30 cm/min, at 22° C. and 60% RH. Five replicate samples were tested and the average reported.

Peel strength was measured by clamping a spliced sample between the upper and lower jaws of the Instron, separated to a gauge length of 25.4 cm, and hooking a Shimpo force gauge (model 1503) through one of the perforations adjacent to the splice and pulling perpendicular to the fixed sample. The force required to break the splice in this mode of separation was reported as the peel strength. Five replicate samples were tested and the average reported. This testing was also done at 22° C. and 60% RH.

Surface roughness was measured using a Taylor Hobson profilometer, by tracing across the leading and trailing edges of a splice, perpendicular to the film width, and approximately 5 mm in from the outside edges of the film. Roughness was reported as the standard deviation of the height of the traced surface, in micrometers. Roughness values reported represent the average of the leading and trailing trace values.

Example 1

Various film combinations were prepared on each ultrasonic splicer without modification (i.e. as received directly from the manufacturer). For comparison, film cement splices were prepared for the two acetate-based film combinations as well. The results of this test are shown in Table 1.

TABLE 1

Splice properties using UNMODIFIED Splicing Units

|  | Tensile Strength (kg) | | | Peel Strength (kg) | | | Surface Roughness ($\mu$m) | | |
| --- | --- | --- | --- | --- | --- | --- | --- | --- | --- |
|  | Hollywood Film Co. | | Metric | Hollywood Film Co. | | Metric | Hollywood Film Co. | | Metric |
| Film Codes | HFC 2K | 24700 | 3001 | HFC 2K | 24700 | 3001 | HFC 2K | 24700 | 3001 |
| 2238/2238 | 24 | 24 | 28 | 2.1 | 4.5 | 3.3 | 17.5 | 33.6 | 18.3 |
| 2234/2234 | 20 | 24 | 23 | 3.0 |  | 5.2 | 18.8 |  | 22.5 |
| 2383/2383 | 16 | 30 | 35 | 2.4 | 4.7 | 1.2 | 18.3 | 34.5 | 18.7 |
| 5234/5234 | 12 | 11 | 15 | 1.3 |  | 1.0 | 39.7 |  | 39.1 |
| 5279/5279 | 4 | 10 | 16 | 0.7 |  | 0.5 | 174.3 |  | 32.8 |
| 2238/5234 | 13 | 16 | 11 | 1.4 | 1.7 | 0.6 | 96.0 | 35.3 | 11.8 |
| 2234/5234 | 14 | 7 | 10 | 1.3 |  | 0.9 |  |  | 15.2 |
| 2383/5279 | 10 | 15 | 11 | 0.9 | 1.5 | 1.2 | 85.6 | 33.1 | 23.5 |

The splices composed of polyester-based film only and the acetate-based film cement splices represent the industry standard with respect to surface roughness and strength for each type of film. Typically the ultrasonic polyester-based splices range from 20–30 kg in tensile strength, 2–5 kg in peel strength, and 18–34 $\mu$m in surface roughness. The acetate control splices made with film cement averaged 30 kg in tensile strength, greater than 1.5 kg in peel strength (the support tears at this value), and about 30 $\mu$m in surface roughness.

Based on current splicing technology and discussions with potential users, it is felt that a tensile strength of at least about 15 kg and peel strength of at least about 1.0 kg, coupled with a surface roughness of less than about 35 $\mu$m should be sufficient for hybrid splicing applications. These values were established as aims for acceptable use.

As indicated in Table 1, acetate films spliced ultrasonically and acetate/polyester hybrid splices prepared the same way are typically significantly lower in tensile and peel strength than what is currently provided. In addition, ultrasonic splices made with acetate films are typically rougher than polyester splices prepared the same way, especially with the HFC model 2K splicer.

Example 2

The Hollywood Film Company model HFC 2K splicer (sliding anvil), as received, has an anvil pressure of approximately 1.8 kg and an anvil traverse time of eight seconds across a 35 mm film strip (corresponding to traverse rate of 4.4 mm/sec). The product of the anvil pressure and traverse time was thus 7.9 kg.mm/sec. The power to the ultrasonic horn is approximately 18 watts.

Additional experiments were undertaken in which the anvil pressure and the anvil traverse time were varied. The power was also varied by incorporation of a variable resistor (0 to 100 ohms) within the unit's circuitry, providing power levels as low as 6 watts.

The initial designed experiment was made using 2383 film spliced to 5279 film. Anvil pressure was varied (1.1, 1.8, 2.5 kg), as was anvil traverse time (8, 10, 12 seconds, corresponding to traverse rates of 4.4, 3.5, and 2.5 mm/sec, respectively). Power levels of 6 and 16 watts were used to complete the factorial design. The results indicated that reducing the anvil pressure to below 1.8 kg (preferably, to 1.1 kg), maintaining an anvil traverse speed of eight seconds, and reducing the power to 16 watts achieved the best compromise between strength and roughness. These parameters (product of anvil pressure and traverse time equals 4.8) yielded splices having a tensile strength of 16 kg, a peel strength of 1.0 kg, and a surface roughness of 14.1 $\mu$m, which meet all of the aims established above. The values for other film combinations are listed in Table 2.

TABLE 2

Effect of Modifications to Hollywood Film Co. HFC 2K Splicer

| Film Codes | Tensile Strength (kg) | Peel Strength (kg) | Roughness ($\mu$m) |
| --- | --- | --- | --- |
| 2383/5279 | 16 | 1.0 | 14.1 |
| 2238/5234 | 16 | 1.4 | 16.1 |
| 2234/5234 | 15 | 1.3 | 22.1 |
| 5234/5234 | 19 | 0.9 | 23.2 |
| 5279/5279 | 6 | 1.0 | 35.9 |

As indicated, dramatic improvements can be made in surface roughness of hybrid splices, along with modest enhancement of tensile strength, without compromising the peel strength. Although homogeneous acetate film splices using 5234 film are acceptable, 5279 film codes remain problematic when spliced with either set of parameters (although an improvement is evident relative to the results reported in Table 1). A relationship between anvil pressure and traverse rate is established, where the product of anvil pressure and traverse rate being less than 6.0 kg.mm/sec generally produces splices that are both strong and smooth when a minimum power of 16 watts is employed. Hybrid splices prepared where the product of anvil pressure and traverse rate was greater than 6.0 kg.mm/sec are unacceptably rough or not sufficiently strong.

Example 3

Hollywood Film Company's model 24700 splicer (rolling anvil), as received, has an anvil pressure of approximately 0.9 kg and an anvil traverse time of eight seconds across a 35 mm film strip (corresponding to traverse rate of 4.4 mm/sec). The product of the anvil pressure and traverse time was thus 4.0 kg.mm/sec. The power to the horn was found to vary considerably (between 8 to 20 watts) depending upon "warm-up" time, ambient temperature and frequency of use (splicing). As indicated in Table 1, homogeneous acetate splices and hybrid splices produced with this splicer were borderline for tensile strength and roughness but adequate for peel strength. Improvements would accordingly still be desirable.

Additional experiments were undertaken in which the anvil pressure was reduced to 0.6 kg. The anvil traverse speed was left unchanged and the power was not intentionally changed. These parameters (product of anvil pressure and traverse time equals 2.64) yielded splices with improvements made in surface smoothness without sacrificing tensile or peel strength. Values for two hybrid film combinations are listed in Table 3.

TABLE 3

Effect of Modifications to Hollywood Film Co. 24700 Splicer

| Film Codes | Tensile Strength (kg) | Peel Strength (kg) | Roughness ($\mu$m) |
|---|---|---|---|
| 2238/5234 | 20 | 2.1 | 34.8 |
| 2383/5279 | 18 | 1.8 | 29.4 |

These hybrid splices meet the criteria established for acceptable splices. The splices are stronger, although slightly rougher, than those obtained with the modified HFC model 2K splicer.

Example 4

The Metric model 3001 splicer (rolling anvil), as received, has an anvil pressure of approximately 1.0 kg and an anvil traverse time of 7.5 seconds across a 35 mm film strip (corresponding to traverse rate of 4.7 mm/sec). The product of the anvil pressure and traverse time is thus 4.7 kg.mm/sec. The average power to the horn is between 11 and 12 watts. As indicated in Table 1, homogeneous acetate splices and hybrid splices prepared with these settings produced splices that were borderline for roughness and unacceptably weak in tensile and peel strength.

Additional experiments were undertaken in which the anvil pressure was varied within its full range (0.6 to 1.2 kg), the anvil traverse speed was also varied within its full range (3 to 14 seconds, corresponding to traverse rates of from 11.7 to 2.5 mm/sec), without changes to the power of the unit. This covered a product of anvil pressure and traverse rate range of 1.5 to 16.8 kg.mm/sec. A full factorial experiment was run splicing 5234 acetate-based film to itself as well as to 2238 PET-based film. It was found that the strongest splices could be generated by keeping the anvil pressure low (<1.0 kg) and the traverse time high (>10 seconds). An optimum set point would be an anvil pressure of 0.7 kg and an anvil traverse time of 14 seconds. Keeping the product of anvil pressure and traverse rate below 3.5 kg.mm/sec can produce acceptable acetate or hybrid splices. More preferably, it should be below 3.0 kg.mm/sec. These settings produced relatively smooth splices with an adequate level of strength. The optimum splicing parameters and physical properties for these film combinations are listed in Table 4.

TABLE 4

Effect of Modifications to Metric 3001 Splicer

| Film Codes | Time (sec) | Pressure (kg) | Tensile Strength (kg) | Peel Strength (kg) | Roughness ($\mu$m) |
|---|---|---|---|---|---|
| 2238/5234 | 14 | 0.8 | 15 | 1.0 | 16.1 |
| 5234/5234 | 14 | 0.6 | 26 | 1.4 | 14.8 |

The homogeneous acetate splice in particular (5234/5234) is stronger and smoother than obtained using the modified HFC 2K ultrasonic splicer.

This invention has been described in detail with particular reference to certain preferred embodiments thereof, but it will be understood that variations and modifications can be effected within the spirit and scope of the invention.

What is claimed is:

1. A method for ultrasonically splicing together overlapping ends of first and second lengths of photographic film strips of common film strip width with a film splicer employing a stationary elongated ultrasonic horn positioned on one side of the overlapping film strip ends in the width direction and a relatively movable anvil positioned on the opposite side of the overlapping film strip ends which traverses across the overlapping film ends by sliding or rolling in the length direction of the horn while the horn is ultrasonically vibrated and which provides pressure to the overlapping film ends while traversing across the overlapping film ends such that ultrasonic energy from the horn is transferred to the overlapping film ends effecting an ultrasonic weld between such film ends, wherein one of the first and second lengths of photographic film strips comprises an acetate based film strip and the other of the first and second lengths of photographic film strips comprises an acetate based film strip or a polyester based film strip, and wherein the product of the anvil pressure and anvil traverse rate is less than 6.0 kg.mm/sec when the anvil is slid across the overlapping film ends and less than 3.5 kg.mm/sec when the anvil is rolled across the overlapping film ends.

2. The method of claim 1, wherein the anvil is slid across the overlapping film ends and wherein the product of the anvil pressure and anvil traverse rate is less than 5.0 kg.mm/sec.

3. The method of claim 2, wherein the anvil pressure is less than 1.8 kg and the anvil traverse rate is less than or equal to 4.4 mm/sec.

4. The method of claim 3, wherein the anvil pressure is about 1.1 kg.

5. The method of claim 1, wherein the anvil is rolled across the overlapping film ends.

6. The method of claim 5, wherein the product of the anvil pressure and anvil traverse rate is less than 3.0 kg.mm/sec.

7. The method of claim 5, wherein the anvil pressure is less than 0.9 kg and the anvil traverse rate is less than or equal to 4.4 mm/sec.

8. The method of claim 7, wherein the anvil pressure is less than or equal to about 0.7 kg.

9. The method of claim 7, wherein the anvil traverse rate is less than or equal to 3.5 mm/sec.

10. The method of claim 5, wherein the anvil pressure is within the range of 0.6 to 0.8 kg and the anvil traverse rate is within the range of from about 2.5 to 4.4 mm/sec.

11. The method of claim 10, wherein the anvil traverse rate is within the range of from about 2.5 to 3.5 mm/sec.

12. The method of claim 1, wherein one of the first and second lengths of photographic film strips comprises an acetate based film strip and the other of the first and second lengths of photographic film strips comprises a polyester based film strip.

* * * * *